(12) United States Patent
Tarkoma

(10) Patent No.: US 8,914,656 B2
(45) Date of Patent: Dec. 16, 2014

(54) ENERGY CONSUMPTION OPTIMISATION FOR WEB APPLICATIONS

(75) Inventor: Sasu Tarkoma, Helsinki (FI)

(73) Assignee: Nokia Corporation, Espoo (FI)

( * ) Notice: Subject to any disclaimer, the term of this patent is extended or adjusted under 35 U.S.C. 154(b) by 224 days.

(21) Appl. No.: 13/517,972

(22) PCT Filed: Dec. 23, 2009

(86) PCT No.: PCT/FI2009/051035
§ 371 (c)(1),
(2), (4) Date: Jun. 20, 2012

(87) PCT Pub. No.: WO2011/076978
PCT Pub. Date: Jun. 30, 2011

(65) Prior Publication Data
US 2012/0260111 A1    Oct. 11, 2012

(51) Int. Cl.
*G06F 1/32* (2006.01)
(52) U.S. Cl.
CPC ..................................... *G06F 1/3203* (2013.01)
USPC ............ 713/320; 713/321; 713/322; 713/340
(58) Field of Classification Search
CPC .. G06F 1/3206; G06F 1/3212; G08B 21/0236
USPC .......................... 713/300, 320, 321, 322, 340
See application file for complete search history.

(56) References Cited

U.S. PATENT DOCUMENTS

| | | | |
|---|---|---|---|
| 5,532,935 A * | 7/1996 | Ninomiya et al. ............ 700/296 |
| 6,329,794 B1 | 12/2001 | Oeda et al. |
| 7,407,108 B1 * | 8/2008 | Euler et al. ............... 235/472.01 |
| 7,526,303 B2 | 4/2009 | Chary |
| 2003/0200481 A1 | 10/2003 | Stanley |
| 2004/0002367 A1 | 1/2004 | Chanut |
| 2006/0140140 A1 | 6/2006 | Fuccello |
| 2008/0133956 A1 | 6/2008 | Fadell |
| 2008/0165714 A1 * | 7/2008 | Dettinger et al. ............. 370/311 |
| 2009/0006878 A1 | 1/2009 | Borghetti et al. |
| 2009/0187780 A1 * | 7/2009 | Keohane et al. ............... 713/324 |
| 2009/0309541 A1 * | 12/2009 | Walrath ........................ 320/107 |
| 2010/0048253 A1 * | 2/2010 | Park et al. ..................... 455/566 |

(Continued)

FOREIGN PATENT DOCUMENTS

| | | |
|---|---|---|
| CN | 1662870 A | 8/2005 |
| EP | 1551160 A1 | 7/2005 |
| WO | 2008/082769 A1 | 7/2008 |
| WO | WO 2009/032776 A2 | 3/2009 |

OTHER PUBLICATIONS

Flinn et al., "Managing Battery Lifetime with Energy-Aware Adaptation", ACM Transactions on Computer Systems, vol. 22, Issue 2, May 2004, pp. 137-179.

(Continued)

*Primary Examiner* — Vincent Tran
(74) *Attorney, Agent, or Firm* — Alston & Bird LLP

(57) ABSTRACT

A method and related apparatus, the method comprising: detecting, in a device, an event triggering a web resource related to a web page; estimating energy consumption of the event triggering the web resource; comparing the estimated energy consumption to a predetermined value of available energy budget; and in response to the estimated energy consumption exceeding the predetermined value of the available energy budget, indicating the exceeding to the user of the device.

17 Claims, 3 Drawing Sheets

(56) References Cited

U.S. PATENT DOCUMENTS

2010/0169681 A1* 7/2010 Wong et al. .................. 713/320
2011/0072378 A1* 3/2011 Nurminen et al. ............ 715/771
2011/0159931 A1* 6/2011 Boss et al. .................... 455/574

OTHER PUBLICATIONS

"Sleep Talking PCs Save Energy and Money", Retrieved on Jul. 1, 2013, Webpage available at: http://www.physorg.com/news159787471.html.
Kansal et al., "Fine-Grained Energy Profiling for Power-Aware Application Design", ACM SIGMETRICS Performance Evaluation Review, vol. 36, Issue 2, Sep. 2008, 5 pages.
Palit et al., "Modeling the Energy Cost of Applications on Portable Wireless Devices", Proceedings of the 11th International Symposium on Modeling, analysis and simulation of wireless and mobile systems, Oct. 27-31, 2008, pp. 346-353.
Margi et al., "Characterizing System Level Energy Consumption in Mobile Computing Platforms", International Conference on Wireless Networks, Communications and Mobile Computing, vol. 2, Jun. 13-16, 2005, pp. 1-6.
Seo et al., "Component-Level Energy Consumption Estimation for Distributed Java-Based Software Systems", Lecture Notes in Computer Science Volume, Component-Based Software Engineering, vol. 5282, 2008, 16 pages.
Peddersen et al., "Energy Driven Application Self-Adaptation at Run-time", Journal of Computers, vol. 3, Issue: 3, Mar. 2008, pp. 14-24.
Lafond et al., "An Opcode Level Energy Consumption Model for a Java Virtual Machine", Proceedings of the 3rd Virtual Machine Research and Technology Symposium, May 6-7, 2004, 2 pages.
"Welcome to the S60WebKit Project", S60 Webkit, Retrieved on Jul. 1, 2013, Webpage available at : http://trac.webkit.org/wiki/S60Webkit.
International Search Report and Written Opinion received for corresponding International Patent Application No. PCT/FI2009/051035, dated Sep. 21, 2010, 10 pages.
Office Action for Chinese Application No. 200981063076. dated May 29, 2014.
Supplementary European Search Report for Application No. EP 09 85 2487 dated May 20, 2014.

* cited by examiner

ENERGY CONSUMPTION OPTIMISATION FOR WEB APPLICATIONS

RELATED APPLICATION

This application was originally filed as PCT Application No. PCT/FI2009/051035 filed Dec. 23, 2009.

FIELD OF THE INVENTION

The present invention relates to energy consumption optimisation, and more particularly to energy consumption optimisation in web application environments.

BACKGROUND OF THE INVENTION

The longevity of mobile device's battery is nowadays of vital importance since the complexity and functionalities of mobile devices increase all the time and the requirements for the enabling hardware increases at the same pace. It is not uncommon to a modern mobile device that there are a number of applications running simultaneously, each application having possibly several threads running, using various system functions such as networking stack and other services.

Web applications today are more elaborate than ever. Web 3.0 concepts, such as widgets, are coming more and more popular, providing users new never-seen-before possibilities to use and control the services they use daily. The term widget refers to a piece of code for a stand-alone application that an end user can install and execute within any separate HTML-based (HyperText Markup Language) web page without requiring additional compilation. For example, various on-screen tools, like clocks, daily weather forecasts and stock market tickers, are typically implemented as widgets.

In general, it can be seen that the development of Web applications is currently guided towards the tendency, where the actions user makes are handled through an event-based approach model. In practice, a web application is a collection of active and passive components, which react to events user initiates via user interface or alternatively another application or sub-application initiates without user interaction.

Power management, in general, has been of interest already for several actors in consumer product industry area. Particularly, within the field of mobile devices several solution have been provided, which concentrate e.g. on radio frequency interface monitoring, energy consumption of a network service or refraining from downloading a web resource. However, none of them provides a reasonable basis for an energy consumption optimisation in an application environment, where widgets and other event-based applications are run continuously in the background.

SUMMARY OF THE INVENTION

Now there has been invented a method and technical equipment implementing the method, by which enable an improved energy consumption optimisation for web application. Various aspects of the invention include a method, an apparatus and a computer program, which are characterized by what is stated in the independent claims. Various embodiments of the invention are disclosed in the dependent claims.

According to a first aspect, there is provided a method comprising detecting, in a device, an event triggering a web resource related to a web page; estimating energy consumption of the event triggering the web resource; comparing the estimated energy consumption to a predetermined value of available energy budget; and in response to the estimated energy consumption exceeding the predetermined value of the available energy budget, indicating the exceeding to the user of the device.

According to an embodiment, the method further comprises: gathering information about the energy consumption of different web-related activities; and establishing the energy budget based on the gathered energy consumption information.

According to an embodiment, the method further comprises: defining the energy budget re-iteratively based on desired operation time of the device.

According to an embodiment, the method further comprises: adjusting the energy budget in accordance with newly gathered energy consumption information of the different web-related activities.

According to an embodiment, the method further comprises: estimating the energy consumption as event-based level for each event triggering one or more web sources; and defining the energy budget for different web resources based on the energy consumption of the events relating to each web resource.

According to an embodiment, the web pages are structured into nodes according to a document object model tree, the method further comprises: estimating the energy consumption of event flows within the document object model nodes of the web page.

According to an embodiment, the method further comprises: gathering information about used uniform resource locator addresses and consumed and generated events in the event flows within the document object model nodes of the web page; analysing the energy consumption for said events and uniform resource locator addresses; and adding energy consumption tags to event objects of said events and uniform resource locator addresses.

According to an embodiment, the method further comprises: creating a priority list of web-related activities; and pausing or stopping one or more web-related activities having lower priority in order to save energy for one or more web-related activities having higher priority.

According to an embodiment, the priority list is at least partly created on the basis of the analysis relating to the energy consumption of event flows within the document object model nodes of the web page.

According to an embodiment, the method further comprises: indicating the exceeding of the estimated energy consumption over the predetermined value of the available energy budget to the user of the device by displaying a text-based or a graphical notification on the display of the device.

According to an embodiment, the method further comprises: indicating the exceeding of the estimated energy consumption over the predetermined value of the available energy budget to the user of the device by displaying in a visual form the expected operation time of the device.

According to an embodiment, the method further comprises: in response to the estimated energy consumption exceeding the predetermined value of the available energy budget, prompting the user of the device a possibility to cancel the operation causing the exceeding of the energy consumption.

The arrangement according to the invention provides significant advantages. The event-based energy consumption estimation provides a viable energy optimisation tool for modern web application environment using dynamic web pages. It also increases the accuracy of the energy consumption estimations within the device. Furthermore, it enables to utilize the user-behaviour data in order to create user-specific energy consumption estimates and thus helps the user to keep the device appropriately charged and functional. Moreover, energy-aware widgets may be provided with useful energy consumption information.

According to a second aspect, there is provided an apparatus comprising: means for detecting an event triggering a web resource related to a web page; means for estimating energy consumption of the event triggering the web resource; means for comparing the estimated energy consumption to a predetermined value of available energy budget; and means for indicating, in response to the estimated energy consumption exceeding the predetermined value of the available energy budget, the exceeding to a user of the apparatus.

According to a third aspect, there is provided an apparatus comprising at least one processor and at least one memory storing computer program code, wherein the at least one memory and stored computer program code are configured to, with the at least one processor, cause the apparatus to at least: detect an event triggering a web resource related to a web page; estimate energy consumption of the event triggering the web resource; compare the estimated energy consumption to a predetermined value of available energy budget; and indicate, in response to the estimated energy consumption exceeding the predetermined value of the available energy budget, the exceeding to the user of the apparatus.

According to a fourth aspect, there is provided a computer program product, stored on a computer readable medium and executable in a data processing device, for carrying out the various embodiments.

According to a fifth aspect, there is provided a computer readable medium comprising computer program code, which computer program code, when executed in at least one processor, is configured to carry out the various embodiments.

These and other aspects of the invention and the embodiments related thereto will become apparent in view of the detailed disclosure of the embodiments further below.

LIST OF DRAWINGS

In the following, various embodiments of the invention will be described in more detail with reference to the appended drawings, in which FIG. 1 shows an example of a typical web page 100 and its components;

DESCRIPTION OF EXAMPLE EMBODIMENTS

In the following, example embodiments will be illustrated by referring to mobile application platforms. It is, however, noted that the invention is not limited to mobile application platforms solely, but it can be implemented in any operating system platform, wherein the energy consumption issues need to be considered, such as in operating system platforms of portable computers.

In the following, examples are given how the embodiments may be implemented in Series 60 platform's S60WebKit software package, which is an example of a web runtime, a portable application framework that allows the creation of widgets on the Series60 programming platform. Same standard internet technologies are available for web runtime applications as are for web pages in general, since the runtime framework uses a browser-based engine for producing content. Web runtime's visible outcome, widget, may be considered as web page without a browser UI.

Figure 1:
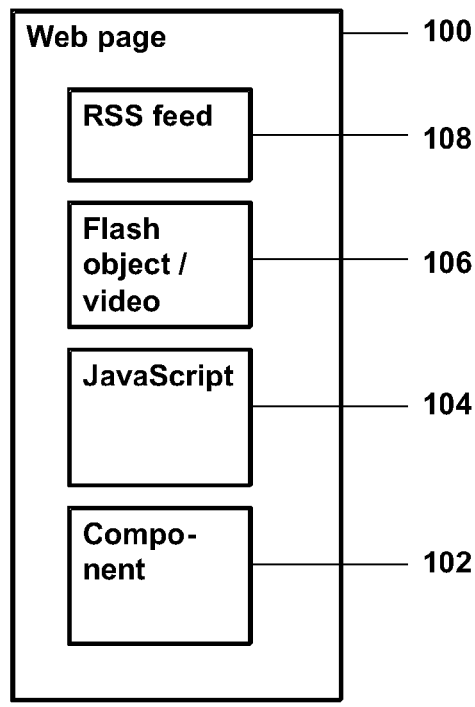

FIG. 1 shows an example of a typical web page 100 and its components. A web page comprises a plurality of information components 102, which may be e.g. textual information, non-textual information, interactive information components within the web page or between a number of web pages (i.e. hyperlinks), etc. The web page may typically comprise JavaScript language based functions 104 for making web pages more responsive to user input by enabling development of enhanced user interfaces and dynamic websites through programmatic access to objects within both the client application and other applications. The JavaScript functions are typically embedded in the web pages and interact with the Document Object Model (DOM) of the web page. JavaScript code usually responds to user actions quickly, because it is run locally in a user's browser instead of a remote server. Furthermore, JavaScript code can detect user actions which HTML alone cannot, such as individual keystrokes.

The web page may further comprise one or more Flash components 106 for adding multimedia components, such as animation, advertisements or video clips into the web page. Similarly, the web page may further comprise one or more RSS (Really Simple Syndication) documents 108, i.e. web feeds, for publishing frequently updated documents, such as news headlines or blog entries. The RSS reader, maintained either as web-based or device-based, provides the application for reading and updating the content. The RSS reader checks the subscribed feeds regularly for new updates, downloads any new updates, and provides a user interface to read the feeds.

All these components are primarily identified by their URI's (Uniform Resource Identifier) and component or function names.

Figure 2:
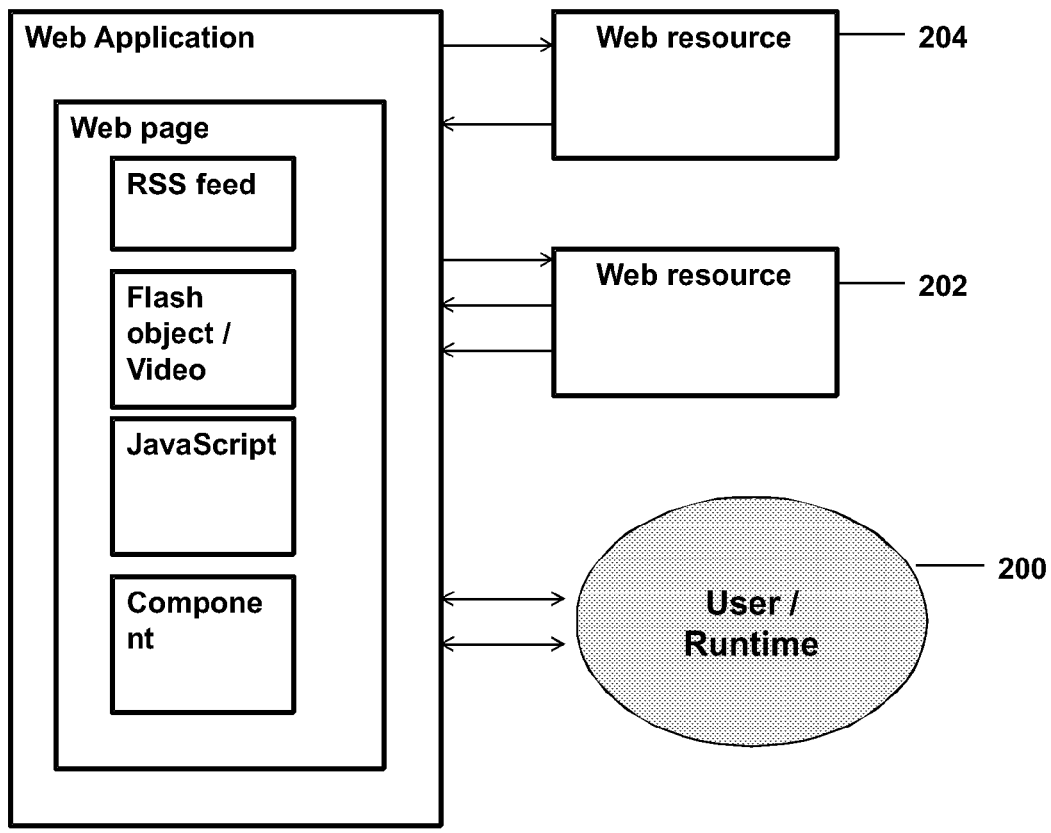
FIG. 2 shows an example of an event-based approach model for the web page of FIG. 1.

As mentioned above, the development of Web applications currently is guided towards the tendency, where the actions user makes are handled in event-based approach model. This is illustrated in FIG. 2. In practice, a modern web application is a collection of active and passive components, which react to events. For example, a user interface action initiated by the user 200, e.g. a keystroke or a mouse click, is an event. Alternatively, another application 200 or sub-application within the device may initiate an event without any user interaction. In addition to this, web resources 202, 204 can also trigger events user-independently. Thus, such a web application provides a system model for the present embodiments.

Accordingly, the embodiments may utilize the web application events as a basis of the energy consumption profiling. Thus, there can be provided a web runtime that supports web pages with passive and active elements and furthermore supports web application frameworks such like JavaScript, AJAX (Asynchronous JavaScript And XML), Java etc. In other words, the client device may advantageously comprise a web application framework supporting dynamic web pages. In addition to Series 60 platform's S60WebKit software package, the embodiments may be implemented, for example, in Series 40 and Maemo mobile platforms.

The client device can comprise an energy monitoring function that monitors the current energy consumption of the web runtime framework and its subcomponents. The client device can further comprise an energy optimizer function that maintains an energy budget that determines the energy consumption policies for the system. The budget may be defined, for example, by predetermined maximum power consumption values or, especially in portable devices, by continuously adjustable values based on the available battery energy and the desired operation time. The budget may, for example, specify that the device should be able to function for the next 48 hours.

Thus, the energy monitoring function detects an event triggering a web resource related to a web page, for example a mouse click by the user for initiating a Flash component. The energy monitoring function determines an estimate about the energy consumption of the event triggering the web source, and compares the estimated energy consumption to a predetermined value of energy budget defined by the energy optimizer function. If the estimated energy consumption exceeds the predetermined value of the available energy budget, then it is indicated to the user of the device that significant energy consumption will happen, if the web resource, e.g. the Flash component, is activated. The user may then be provided with a possibility to cancel the operation, if desired, to prevent the significant energy consumption.

The energy optimizer function, which can be embedded to the web runtime framework, may contain a priority list of the applications, whereby some applications and processes are prioritized over others. Thus, the energy optimizer function may request from the web runtime that some of its activities are paused or even stopped for energy saving purposes in order to be able to maintain the desired applications running for a predefined time period.

Figure 3:
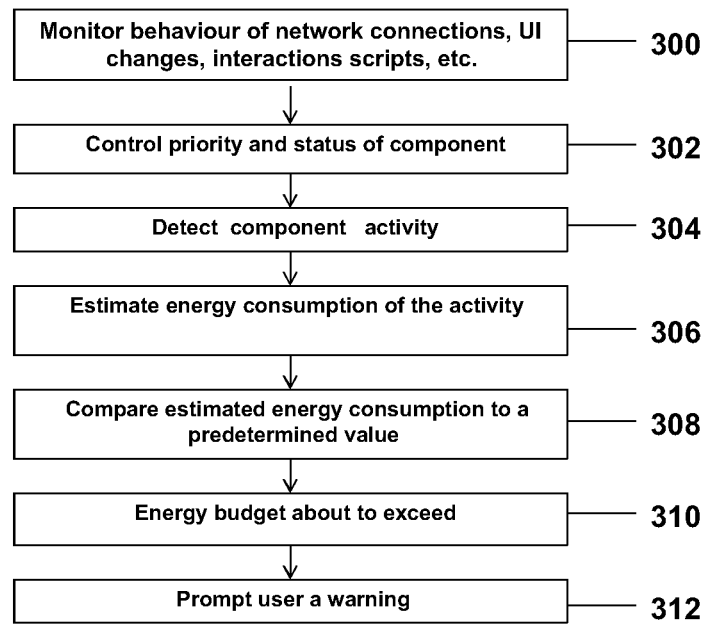
FIG. 3 shows a flow chart of an exemplified energy accounting process according to an embodiment.

The process of energy accounting may be illustrated by the flow chart of FIG. 3 depicting an example of the process. Initially, the energy monitoring function monitors (300) the active and passive behaviour of the device. This monitoring may include network connections, UI selections, playback options and state animations, silent and user initiated interactions, active scripts, etc. The energy monitoring function provides this information to the energy optimizer function as initial information.

The energy optimizer function controls (302) the priority and the status of the software component based on the energy budget. Thus, the energy optimizer function gathers and maintains information about the energy consumption of different activities, and adjusts this information while gathering more history data of the operation of a particular activity. Consequently, the energy optimizer function first provides an approximated estimate about the energy consumption of a particular activity, and then refines the estimate when more data is available. The energy optimizer function controls the budget according to these estimates and possibly also provides the energy monitoring function with the updated energy consumption estimates.

Then, upon the energy monitoring function detecting activity relating to a component (304), i.e. detects an event triggering a web resource related to a web page, the energy monitoring function obtains an estimate (306) about the energy consumption of the event triggering the web source, and compares (308) the estimated energy consumption to the energy budget value defined by the energy optimizer function. If it is noticed that the estimated energy consumption will exceed the available energy budget (310), the user of the device is provided (312) with an indication or a warning.

For example, if the device's battery is indicating low energy status, the energy optimizer function may indicate to the user that activating the component may drain the battery. Feedback can be shown via the web page the user is currently browsing, or even more accurate manner feedback can be shown by web application or widget that consumes currently a lot of energy. The feedback may be presented in visual form indicating to user how many hours the device is expected to be fully functional in the current running application setup. The energy optimizer function may also require, via prompting the user in the UI, that some applications and processes should be prioritized over the others. Thus, the energy optimizer function may suggest the order of prioritization to the user, or the energy optimizer function may prompt a feedback from the user to decide, which applications and processes should be prioritized over the others.

The energy optimizer function may delay some communications, and even ask the scheduler to stop some activities. Delays in communications may occur in e.g. RSS feed update operations. Optimization may also include indication to the user that activation of a certain component such as Flash or video playback will consume energy and thus reduce remaining operating time. Optimization may also comprise pausing inactive elements or elements that are not in focus on a pointing cursor.

According to an embodiment, the monitoring of energy consumption is done for each web resource event separately. In this process, the Document Object Model (DOM) of the web page may be utilized. The Document Object Model (DOM) is a platform- and language-neutral interface, defined by the WorldWideWeb Consortium W3C, which allows programs and scripts to dynamically access and update the content, structure and style of documents. The Document Object Model provides a standard set of objects for representing HTML and XML (eXtensible Markup Language) documents, a standard model of how these objects can be combined, and a standard interface for accessing and manipulating them.

Figure 4:
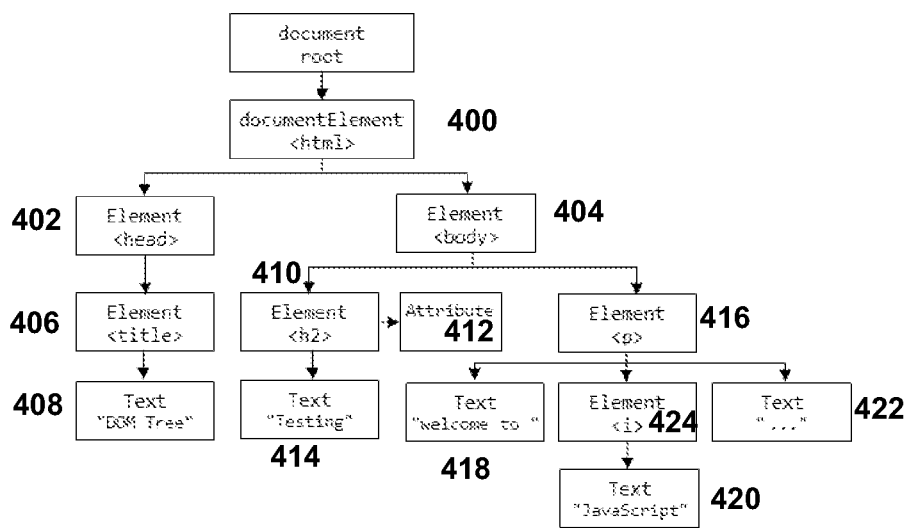
FIG. 4 shows an example of a DOM tree.

FIG. 4 shows an example of a DOM tree. Document object modelling nodes are the primary data type for the DOM. In the DOM, documents have a logical structure which is very much like a tree; to be more precise, which is like a "forest" or "grove", which can contain more than one tree. Each document contains zero or one doctype nodes, one root element node, and zero or more comments or processing instructions; the root element serves as the root of the element tree for the document. The DOM is a logical model that may be implemented in any convenient manner.

In the DOM tree example of FIG. 4, the root element 400 is divided into two document structure elements, a <head> element 402 and a <body> element 404. The document structure element <head> 402 is further defined to comprise a document head element <title> 406, having a definition in text-form 408 as "DOM Tree", which is typically shown in the web page's title bar. The document structure element <body> 404 is further divided into two block elements, a second-highest level header element <h2> 410, having an attribute 412 and a definition in text-form 414 as "Testing", and a paragraph element <p> 416. The paragraph element <p> 416 is further divided into three text element 418, 420, 422, wherein the visual presentation of the text element 422 is further defined as italics by the italics element <i> 424.

The DOM application programming interface API provides methods for capturing events. The DOM API also provides an event object which contains information specific to a given event that can be used by an event handler. The event handler is a piece of code, which activates in response to a certain user's or browser's action, such as clicking a button, entering some text, or loading a content from web. For example, JavaScripts are often event-driven.

There are two phases of event flow: a capture phase followed by a bubbling phase. The event first flows down from the document root to the target element that triggers the event. The event is captured. Then follows the bubbling phase: The event bubbles up from the target element to its parent node, all the way back to the document root. Now events are generated and consumed by nodes, and they can be monitored and profiled. This provides a way to conveniently model the behaviour of dynamic web applications.

Figure 5:
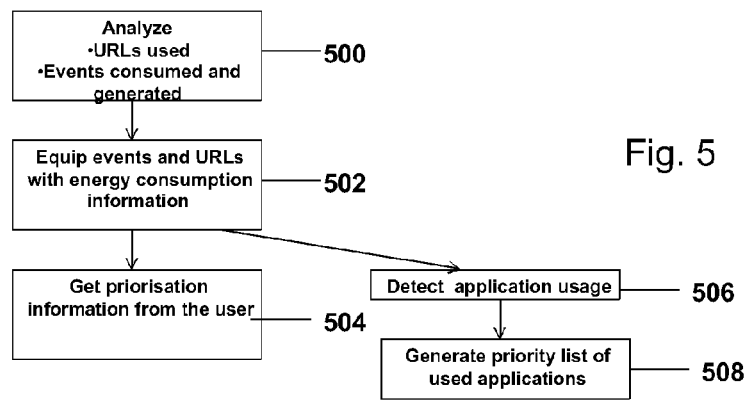
FIG. 5 shows a flow chart of the operation of an exemplified event-based energy profiling system according to an embodiment.

According to an embodiment, the energy monitoring function that monitors the energy consumption of the events is also utilized in an event-based energy profiling system, the operation of which is shown in the example of FIG. 5. The energy profiling system provides also the resource instrumentation. The instrumentation provides the result that is in fact an energy consumption model based on the DOM tree and DOM events.

As a first phase, the used URLs and the consumed and generated events are analysed (500). The number and average size of the data requests are of particular interest for the energy consumption. Alternatively or in addition, the analysis of the information may be provided externally to the application within the runtime system, e.g. from another application or a database maintaining the analysis information. In the instrumentation phase (502), energy consumption tags may be added to the events and URLs of a web application, which enables, for example, to create a detailed energy consumption breakdown for the web application and to calculate e.g. an average energy consumption for the use of the web application.

On the basis of the event-based energy analysis and application-specific energy consumption, it is the possible to profile e.g. all the used web applications. The energy profiling system may thus prompt (504) the user to prioritize at least some applications and processes over other applications and processes, as described above, i.e. either according to the suggested order of prioritization or according to the decision of the user.

On the other hand, the profiling could be carried out only for the active applications. Thus, the energy monitoring function detects application usage (506), i.e. monitors, which applications are active. Once the active applications have been detected, energy profiling is carried out for the active applications (508) e.g. in the same manner as in the step 504.

According to an embodiment, the energy consumption may be instrumented for longer time period, and the first energy consumption estimate is refined only later when more instrumentation data is available. This way system may give more precise and user-tailored estimates of energy consumption to the user.

The DOM tree is the basis for the visual presentation of the web application and also for the user interaction. It is hence possible to add various kinds of overlay graphics to highlight energy hotspots, which are identified on the basis of the energy profiling system. For example, a graphical warning of high energy consumption may be shown when the user is clicking an icon of such an application.

A skilled man appreciates that any of the embodiments described above may be implemented as a combination with one or more of the other embodiments, unless there is explicitly or implicitly stated that certain embodiments are only alternatives to each other.

Figure 6:
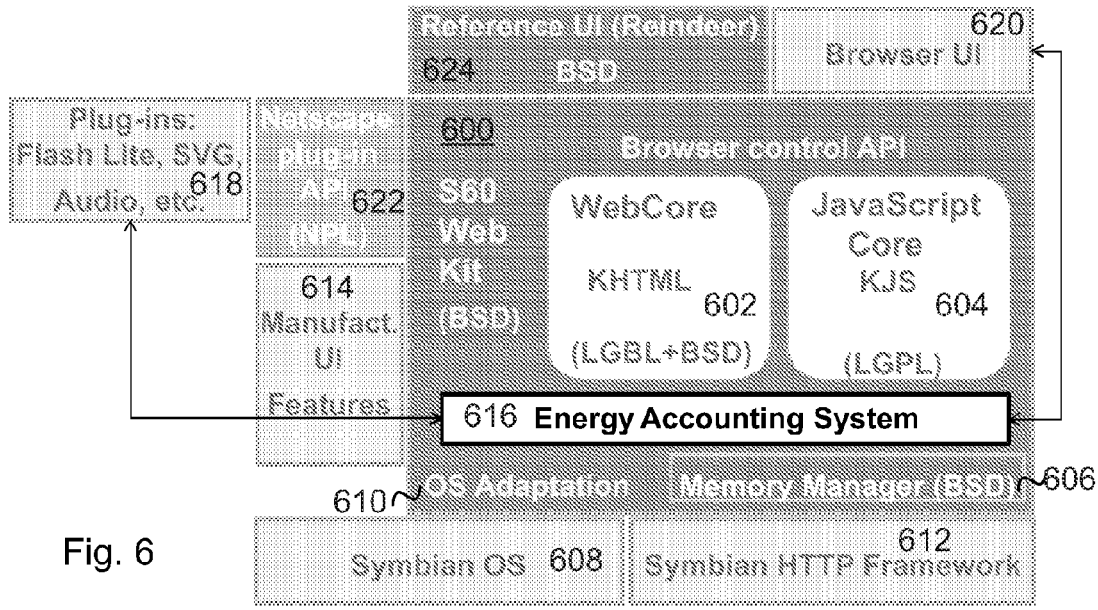
FIG. 6 shows an example of integrating the energy accounting system according to the embodiments in the Series 60 platform's S60WebKit software package.

FIG. 6 shows an example of integrating the energy accounting system according to the embodiments in the Series 60 platform's S60WebKit software package. S60WebKit is an engine behind S60 web browser application. WebKit 600 contains WebCore 602 and JavaScriptCore 604 components. These components utilise KHTML (HTML layout engine developed by the KDE (K Desktop Environment) project) and KJS (KDE's JavaScript engine) in an open source project. S60WebKit utilises a memory manager 606 implemented under open source licence. S60WebKit integrates to Symbian OS 608 by a specific adaptation layer 610 and uses also Symbian HTTP framework 612. Also manufacturer-specific UI features 614 are linked to the Symbian OS layer. The energy accounting system 616 gets input from industry standard S60 plug-ins 618, like Flash Lite, SVG-tiny (scalable vector graphics), audio, etc. On the other hand, the energy accounting system 616 also interacts directly with S60 Browser UI 620. S60WebKit offers also interfaces to other already opensourced plugins, as is case with Netscape plug-in API 622. It is naturally possible to integrate several user interfaces on top of S60WebKit. For example, a user interface 624 made under open source Berkeley Software Distribution licence is one possibility in addition to S60's own browser UI. For a more detailed description of S60WebKit, a reference is made to the documents available at http://webkit.org/.

Figure 7:
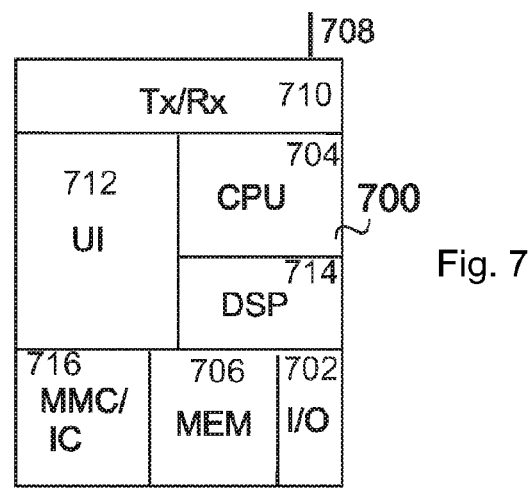
FIG. 7 shows a simplified block chart of an apparatus capable of operating the application framework required for the embodiments.

FIG. 7 illustrates a simplified structure of an apparatus 700 capable of operating the application framework required for the embodiments. The apparatus 700 can be, for example, a mobile terminal, a PDA device, a personal computer (PC) or any other data processing device, wherein the energy consumption of a web application could be monitored. The apparatus comprises I/O means 702 (I/O), a central processing unit 704 (CPU) and memory 706 (MEM). The memory 706 comprises a read-only memory ROM portion and a rewriteable portion, such as a random access memory RAM and FLASH memory. The web application framework including the functions described above is stored in the memory (MEM).

The information, which is used to communicate with different external parties, e.g. a CD-ROM, other devices, such as a web server, and the user, is transmitted through the I/O means 702 to/from the central processing unit 704. The apparatus comprises means for exchanging internet information, e.g. an antenna 708 and a transceiver 710 (Tx/Rx) or a transmission port. If the apparatus is implemented as a mobile station, the transceiver 710 (Tx/Rx) communicates with the wireless network, typically with a base transceiver station (BTS) through the antenna 708. User Interface 712 (UI) equipment typically includes a display, a keypad, a microphone and connecting means for headphones. The apparatus may further comprise a dedicated digital signal processor 714 (DSP) and connecting means 716 (MMC), such as a standard form slot for various hardware modules, or for integrated circuits IC, which may provide various applications to be run in the apparatus.

Accordingly, the process of energy accounting may be implemented in the apparatus for example such that the energy monitoring function, run by the central processing unit (CPU) 704 or the dedicated digital signal processor (DSP) 714 of the apparatus, is arranged to detect an event triggering a web resource related to a web page and to estimate energy consumption of the event triggering the web source. Then the energy monitoring function compares the estimated energy consumption to a predetermined value of available energy budget submitted by the energy optimizer function, also run by the CPU or the DSP, and if the estimated energy consumption exceeds the predetermined value of the available energy budget, this is indicated to the user of the device possibly via the display. Thus, the CPU or the DSP may provide the means for detecting an event triggering a web resource related to a web page; means for estimating energy consumption of the event triggering the web source; means for comparing the estimated energy consumption to a predetermined value of available energy budget; and means for indicating, in response to the estimated energy consumption exceeding the predetermined value of the available energy budget, the exceeding to a user of the apparatus.

Consequently, the functionalities of the embodiments may be implemented in an apparatus, such as a mobile station, also as a computer program which, when executed in a central processing unit CPU or in a dedicated digital signal processor DSP, affects the terminal device to implement procedures of the embodiments. Functions of the computer program SW may be distributed to several separate program components communicating with one another. The computer software may be stored into any memory means, such as the hard disk of a PC or a CD-ROM disc, from where it can be loaded into the memory of mobile terminal. The computer software can also be loaded through a network, for instance using a TCP/IP protocol stack.

It is also possible to use hardware solutions or a combination of hardware and software solutions to implement the inventive means. Accordingly, the above computer program product can be at least partly implemented as a hardware solution, for example as ASIC or FPGA circuits, in a hardware module comprising connecting means for connecting the module to an electronic device, or as one or more integrated circuits IC, the hardware module or the ICs further including various means for performing said program code tasks, said means being implemented as hardware and/or software.

It is obvious that the present invention is not limited solely to the above-presented embodiments, but it can be modified within the scope of the appended claims.

The invention claimed is:

1. A method comprising:
   gathering information about the energy consumption of different web-related activities;
   establishing an available energy budget based on the gathered energy consumption information;
   detecting, in a device comprising a web application framework, an event triggering a web resource related to a web page;
   estimating energy consumption of the event triggering the web resource;
   comparing the estimated energy consumption to the available energy budget; and
   in response to the estimated energy consumption exceeding the predetermined value of the available energy budget, indicating the exceeding to the user of the device.

2. The method according to claim 1, the method further comprising:
   defining the available energy budget re-iteratively based on desired operation time of the device.

3. The method according to claim 1, the method further comprising:
   adjusting the available energy budget in accordance with newly gathered energy consumption information of the different web-related activities.

4. The method according to claim 1, the method further comprising:
   estimating the energy consumption as event-based level for each event triggering one or more web sources; and
   defining the available energy budget for different web resources based on the energy consumption of the events relating to each web resource.

5. The method according to claim 4, wherein the web pages are structured into nodes according to a document object model tree, the method further comprising:
   estimating the energy consumption of event flows within the document object model nodes of the web page.

6. The method according to claim 5, the method further comprising:
   gathering information about used uniform resource locator addresses and consumed and generated events in the event flows within the document object model nodes of the web page;
   analysing the energy consumption for said events and uniform resource locator addresses; and
   adding energy consumption tags to event objects of said events and uniform resource locator addresses.

7. The method according to claim 1, the method further comprising:
   creating a priority list of web-related activities; and
   pausing or stopping one or more web-related activities having lower priority in order to save energy for one or more web-related activities having higher priority.

8. The method according to claim 7, wherein the priority list is at least partly created on the basis of the analysis relating to the energy consumption of event flows within the document object model nodes of the web page.

9. The method according to claim 1, the method further comprising:
   indicating the exceeding of the estimated energy consumption over the available energy budget to the user of the device by displaying a text-based or a graphical notification on the display of the device.

10. The method according to claim 1, the method further comprising:
    indicating the exceeding of the estimated energy consumption over the available energy budget to the user of the device by displaying in a visual form the expected operation time of the device.

11. The method according to claim 1, the method further comprising:
    in response to the estimated energy consumption exceeding the available energy budget, prompting the user of the device a possibility to cancel the operation causing the exceeding of the energy consumption.

12. The method according to claim 1, wherein the device comprises a web application framework supporting dynamic web pages.

13. An apparatus comprising at least one processor and at least one memory storing computer program code, wherein the at least one memory and stored computer program code are configured to, with the at least one processor, cause the apparatus to at least:
    gather information about the energy consumption of different web-related activities;
    establish an available energy budget based on the gathered energy consumption information;
    detect an event triggering a web resource related to a web page;
    estimate energy consumption of the event triggering the web resource;
    compare the estimated energy consumption to the available energy budget; and
    indicate, in response to the estimated energy consumption exceeding the predetermined value of the available energy budget, the exceeding to the user of the apparatus.

14. A computer program product, stored on a non-transitory computer readable medium and executable in a data processing device, the computer program product comprising:
- a computer program code section for gathering information about the energy consumption of different web-related activities;
- a computer program code section for establishing an available energy budget based on the gathered energy consumption information;
- a computer program code section for detecting an event triggering a web resource related to a web page;
- a computer program code section for estimating energy consumption of the event triggering the web resource;
- a computer program code section for comparing the estimated energy consumption to the available energy budget; and
- a computer program code section for indicating, in response to the estimated energy consumption exceeding the predetermined value of the available energy budget, the exceeding to a user of the apparatus.

15. The computer program product according to claim 14, further comprising:
- a computer program code section for defining the available energy budget re-iteratively based on desired operation time of the apparatus.

16. The computer program product according to claim 14, further comprising:
- a computer program code section for adjusting the available energy budget in accordance with newly gathered energy consumption information of the different web-related activities.

17. A non-transitory computer-readable storage medium comprising computer program code, which computer program code, when executed in at least one processor, is configured to cause an apparatus to at least:
- gather information about the energy consumption of different web-related activities;
- establish an available energy budget based on the gathered energy consumption information;
- detect an event triggering a web resource related to a web page;
- estimate energy consumption of the event triggering the web resource;
- compare the estimated energy consumption to a predetermined value of the available energy budget; and
- indicate, in response to the estimated energy consumption exceeding the predetermined value of the available energy budget, the exceeding to the user of the apparatus.

* * * * *

UNITED STATES PATENT AND TRADEMARK OFFICE
CERTIFICATE OF CORRECTION

| | | Page 1 of 1 |
|---|---|---|
| PATENT NO. | : 8,914,656 B2 | |
| APPLICATION NO. | : 13/517972 | |
| DATED | : December 16, 2014 | |
| INVENTOR(S) | : Tarkoma | |

It is certified that error appears in the above-identified patent and that said Letters Patent is hereby corrected as shown below:

In the claims:

Column 12,
Lines 19 and 20, cancel "a predetermined value of".

Signed and Sealed this
Twenty-first Day of July, 2015

Michelle K. Lee
*Director of the United States Patent and Trademark Office*